(12) United States Patent
Myles

(10) Patent No.: US 6,561,514 B2
(45) Date of Patent: May 13, 2003

(54) MULTIPLICATION, ADDITION AND SUBTRACTION CARD GAME

(76) Inventor: Wanda F. Myles, 1834 Midway, Shreveport, LA (US) 71108

( * ) Notice: Subject to any disclaimer, the term of this patent is extended or adjusted under 35 U.S.C. 154(b) by 0 days.

(21) Appl. No.: 09/771,059

(22) Filed: Jan. 29, 2001

(65) Prior Publication Data

US 2002/0101034 A1 Aug. 1, 2002

(51) Int. Cl.[7] .................................................. A63F 1/00
(52) U.S. Cl. ........................ 273/292; 273/236; 273/302; 273/308; 273/299
(58) Field of Search ................................ 273/292, 302, 273/308, 236

(56) References Cited

U.S. PATENT DOCUMENTS

| | | | | |
|---|---|---|---|---|
| 3,661,392 A | * | 5/1972 | Abney .......................... | 273/293 |
| 4,014,547 A | * | 3/1977 | Gomez et al. ............... | 273/243 |
| 4,076,253 A | * | 2/1978 | Eriksen ................... | 273/157 R |
| 4,173,834 A | * | 11/1979 | Arzola ........................ | 434/209 |
| 4,266,214 A | * | 5/1981 | Peters, Jr. ................. | 340/323 R |
| 4,281,835 A | * | 8/1981 | Seiden ......................... | 273/299 |
| 4,346,897 A | * | 8/1982 | Sisak .......................... | 273/146 |
| 4,379,700 A | * | 4/1983 | Pollock ....................... | 273/299 |
| 4,512,746 A | * | 4/1985 | Turner ......................... | 273/299 |
| 5,018,976 A | * | 5/1991 | Kuyath ........................ | 273/299 |
| 5,033,754 A | * | 7/1991 | Finch .......................... | 273/299 |
| 5,507,495 A | * | 4/1996 | Kiss ............................. | 273/243 |
| 5,603,501 A | * | 2/1997 | Hayes ......................... | 273/240 |
| 5,639,091 A | * | 6/1997 | Morales ....................... | 273/299 |
| 5,759,041 A | * | 6/1998 | Batten ......................... | 434/191 |
| 5,782,471 A | * | 7/1998 | Bautista et al. ............. | 273/256 |
| 6,077,079 A | * | 6/2000 | Barnes ........................ | 273/269 |
| 6,102,401 A | * | 8/2000 | Segman et al. ............. | 273/272 |
| 6,109,924 A | * | 8/2000 | Sanford et al. ............. | 273/299 |
| 6,234,484 B1 | * | 5/2001 | Strauss ........................ | 273/292 |
| 6,341,779 B1 | * | 1/2002 | Merritt ........................ | 273/272 |

* cited by examiner

*Primary Examiner*—Benjamin H. Layno
*Assistant Examiner*—D Collins
(74) *Attorney, Agent, or Firm*—John M. Harrison

(57) ABSTRACT

A multiplication, addition and subtraction card game for strengthening multiplication, addition and subtraction skills. In a preferred embodiment, the card game utilizes a 124-card deck including 100 multiplication factor cards, each of which displays a multiplication equation on one face thereof and is grouped into one of five color-coded categories. The card deck further includes multiple strategy cards, typically including 8 FREE cards and 16 SUBTRACT cards. To maximize his or her point gain, each player attempts to play a card which displays an equation the product of which is the same as the product of the equation displayed on the card played by the previous player, and the sum of the products is added to the player's score. For a smaller number of points, a player may play a card which displays an equation having a different product than that of the equation displayed on the card played by the previous player but has the same color as the previous player's card. Each player may play a FREE card to gain points and pass play to the next player or a SUBTRACT card to deduct points from the previous player's score. The player who first reaches a predetermined number of points or has the most points after a predetermined number of rounds is the winner.

8 Claims, 5 Drawing Sheets

MULTIPLICATION, ADDITION AND SUBTRACTION CARD GAME

BACKGROUND OF THE INVENTION

1. Field of the Invention

This invention relates to mathematical card games and more particularly, to a multiplication, addition and subtraction card game for strengthening multiplication, addition and subtraction skills and which requires participants to perform mathematical operations to accurately calculate their scores throughout the game. In a preferred embodiment, the card game utilizes a 124-card deck including 100 multiplication factor cards, each of which displays a multiplication equation on one face thereof and is grouped into one of five color-coded categories. The card deck further includes multiple strategy cards, typically including 8 FREE cards and 16 SUBTRACT cards. To maximize his or her point gain, each player attempts to play from his or her dealt card hand a card which displays an equation the product of which is the same as the product of the equation displayed on the card played by the previous player. The player adds the product of the equation displayed on the selected dealt card with the product of the equation displayed on the card played by the previous player. In the event that a player's dealt hand does not include a card which displays an equation the product of which is the same as that of the equation displayed on the card played by the previous player, that player may play a card which displays an equation having a different product than that of the equation displayed on the card played by the previous player but having the same color as the previous player's card to gain a smaller number of points. Each player may play a FREE card to gain points and pass play to the next player or a SUBTRACT card to deduct points from the previous player's score. The player who first reaches a predetermined number of points or has the most points after a predetermined number of rounds is the winner.

Teaching multiplication tables to elementary school students is a fundamental goal of educators. This goal is frequently accomplished by writing a multiplication equation on one side of a flash card and the product of the equation on the opposite side of the card, and having the student calculate the product as quickly as possible by looking at the equation on the card while someone holding the card verifies or corrects the answer as shown on the opposite side of the card. While repeated use of the flashcards facilitates the students' learning the multiplication tables, the process is typically frustrating for the student and the student may lose interest after a short period of time. Accordingly, presenting multiplication tables in an enjoyable game format facilitates a more effective teaching method.

2. Description of the Prior Art

Various card games or puzzles are known in the art for teaching mathematical concepts to players. Typical of these is the educational puzzle described in U.S. Pat. No. 4,076,253, dated Feb. 28, 1978, to Eriksen. The Eriksen puzzle is characterized by multiple, variously-shaped cards which are arranged on a flat surface to form a prescribed numeral by matching a multiplication equation provided adjacent to the edge of one card with the product of the equation, provided adjacent to the edge of the abutting card. U.S. Pat. No. 4,379,700, dated Apr. 12, 1983, to Pollock, details a multiplication/division tutorial game containing chips which represent multiplication products and playing cards which represent multiplier-multiplicand combinations that equal the products of the chips. Each player has a placemat on which his or her dealt and drawn cards are placed. The chips are arranged in three piles, and the players take turns trying to capture the chips by combining pairs of cards whose products equal those of any one of the three top chips. The player who captures the most chips is declared the winner. Mathematical teaching cards are described in U.S. Pat. No. 4,512,746, dated Apr. 23, 1985, to Turner, which teaching cards are characterized by a series of mathematical teaching cards including multiple decks each having a level of difficulty identification and multiple sets of mathematical statements having the same answer. The teaching cards can be used for multiplication, division, subtraction and addition or any combination thereof. U.S. Pat. No. 5,018,976, dated May 28, 1991, to Kuyath, discloses a teaching system for enhancing the learning of sets of facts, including multiple problem cards that are divided into sets by color-coding. A key card that is placed in view of the student or students contains color-coded answers to assist the student or students in choosing the correct response to a problem. U.S. Pat. No. 5,639,091, dated Jun. 17, 1997, to Morales, discloses integer cards for educating children in basic mathematical concepts. The deck includes 52 cards each containing integers between −6 and +6, and each card belongs to one of four suits having different arithmetic operation symbols. Two of the suits are of one color, and two of the suits are of another color. The cards can be used in a variety of games to instruct students in concepts ranging from simple matching to more complex arithmetic calculations. An educational card system is described in U.S. Pat. No. 6,109,924, dated Aug. 29, 2000, to Sanford, Sr., et al The card system includes multiple question cards and multiple answer cards, each answer card corresponding to one or more question cards. Matching question and answer cards have the same visual pattern, such that a student can confirm the answer to a mathematical problem on a question card by matching the pattern on the answer card with the pattern on the question card.

An object of this invention is to provide a game for strengthening multiplication, addition and subtraction skills through card play.

Another object of this invention is to provide an enjoyable and entertaining method of strengthening multiplication, addition and subtraction skills.

Another object of this invention is to provide a card game which requires each player to perform a mathematical operation to accurately calculate his or her score throughout the game.

Yet another object of this invention is to provide a multiplication, addition and subtraction card game which utilizes a card deck containing multiplication for cards each displaying a multiplication equation, wherein each player for maximum point gain calculates the products of the equations displayed on his or her respective dealt cards in an attempt to find a card which displays an equation the product of which is the same as the product of the equation displayed on the card played by the previous player, and adds the products of the equations.

Still another object of this invention is to provide a card game which utilizes a card deck including multiplication factor cards, FREE cards and SUBTRACT cards, wherein each player may play a FREE card to gain points and pass play to the next player or a SUBTRACT card to deduct points from the previous player's score.

Yet another object of this invention is to provide a multiplication, addition and subtraction card game which utilizes a card deck containing cards each having a unique multiplication equation, wherein some of the cards in the deck display different equations having the same product; and wherein the cards in the deck are grouped into one of multiple color-coded categories, such that for maximum point gain each player attempts to play a card which displays an equation having the same product as that of the equation displayed on the card which was played by the previous player and adds the products of the equations to gain the same number of points for a play, or each player may play a card which has the same color as the card played by the previous player but displays an equation having a different product to gain a smaller number of points.

A still further object of this invention is to provide a multiplication, addition and subtraction card game which utilizes a card deck having 100 multiplication factor cards each including a multiplication equation displayed on the face thereof and grouped into one often denominations, with the first denomination including ten cards displaying the numeral one multiplied by the successive numerals one through ten, respectively; the second denomination including ten cards displaying the numeral two multiplied by the successive numerals one through ten, respectively, the third denomination including ten cards displaying the numeral three multiplied by the successive numerals one through ten, respectively; and the fourth through tenth denominations following the same pattern, with each of the denominations grouped into one of five color-coded categories The card deck further includes strategy cards having multiple FREE cards and multiple SUBTRACT cards.

SUMMARY OF THE INVENTION

These and other objects of the invention are provided in a multiplication, addition and subtraction card game for strengthening multiplication, addition and subtraction skills. In a preferred embodiment, the card game utilizes a 124-card deck including 100 multiplication factor cards, each of which displays a multiplication equation on one face thereof and is grouped into one of five color-coded categories. The card deck further includes multiple strategy cards, typically including 8 FREE cards and 16 SUBTRACT cards. To maximize his or her point gain, each player attempts to play a card which displays an equation the product of which is the same as the product of the equation displayed on the card played by the previous player, and the sum of the products is added to the player's score. For a smaller number of points, a player may play a card which displays an equation having a different product than that of the equation displayed on the card played by the previous player but has the same color as the previous player's card. Each player may play a FREE card to gain points and pass play to the next player or a SUBTRACT card to deduct points from the previous player's score. The player who first reaches a predetermined number of points or has the most points after a predetermined number of rounds is the winner.

BRIEF DESCRIPTION OF THE DRAWINGS

The invention will be better understood by reference to the accompanying drawings, wherein.

DESCRIPTION OF THE PREFERRED EMBODIMENTS

Figure 1A:
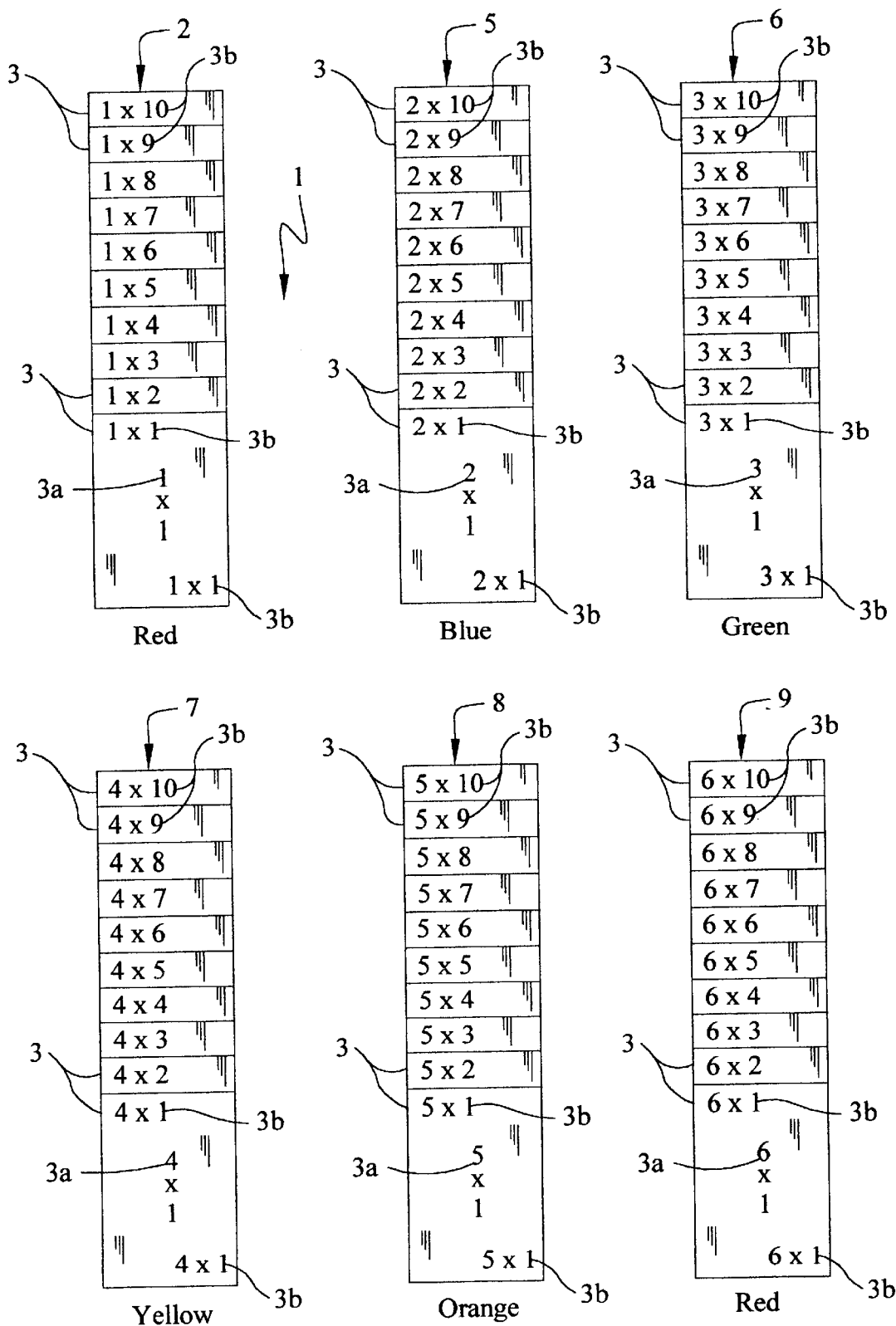
FIG. 1 is a top view of a typical 124-card deck used for the multiplication, addition and subtraction card game of this invention.
Figure 1B:
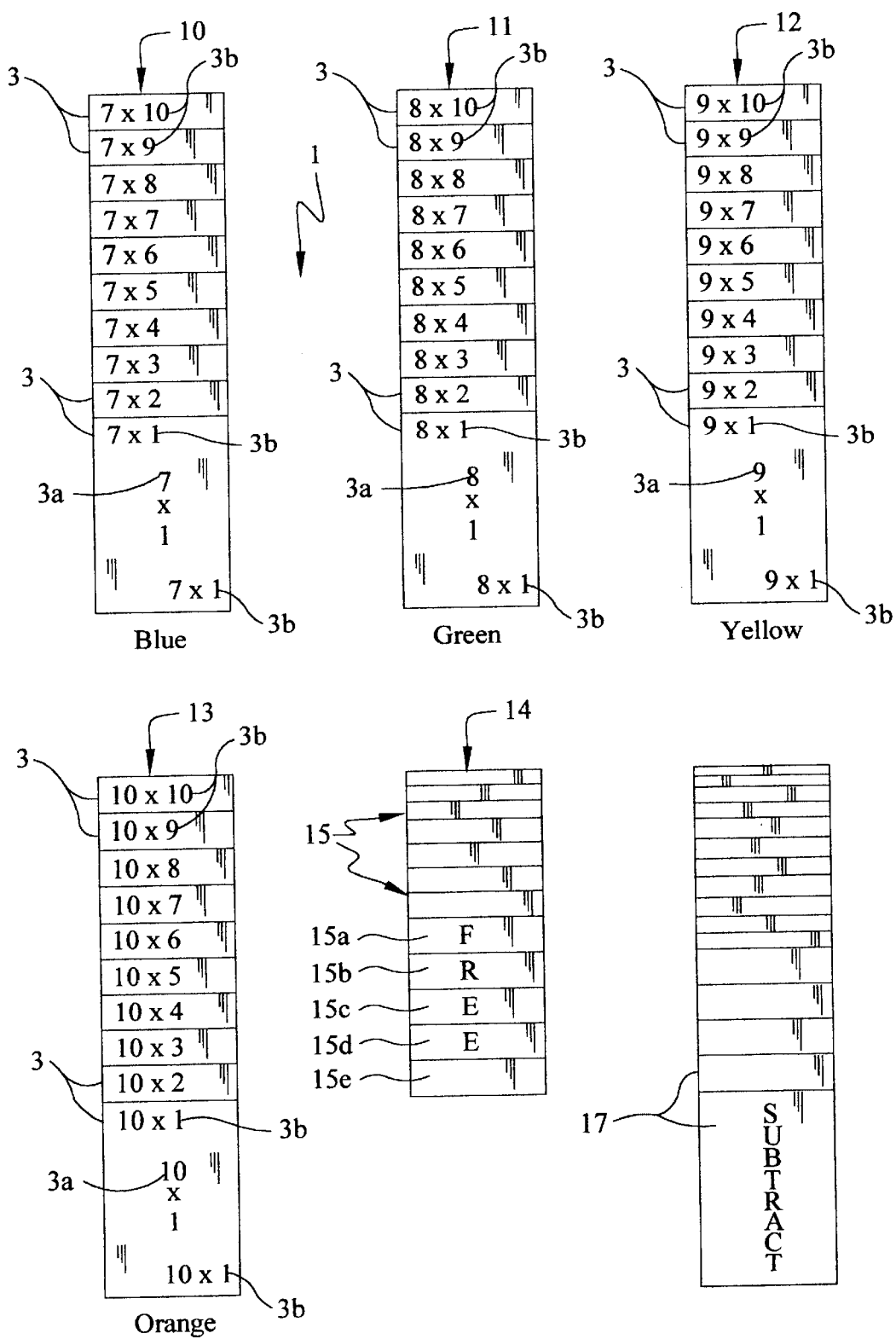

Referring initially to FIG. 1 of the drawings, in a preferred embodiment a typical card deck used with the multiplication, addition and subtraction card game of this invention is generally illustrated by reference numeral 1 and includes one hundred multiplication factor cards 3 and twenty-four strategy cards 14. The multiplication factor cards 3 are grouped into ten denominations (generally illustrated by reference numerals 2 and 5–13, respectively) each having ten multiplication factor cards 3, with a multiplication equation displayed typically in large indicia 3a, as well as in small indicia 3b at opposite corners, on one face of each multiplication factor card 3. The ten successive multiplication factor cards 3 of a first denomination 2 display multiplication of the numeral "1" by the numerals one through ten, respectively, as illustrated. The ten successive multiplication factor cards 3 of a second denomination 5 display multiplication of the numeral "2" by the numerals one through ten, respectively, and the ten successive multiplication factor cards 3 of a third denomination 6 display multiplication of the numeral "3" by the numerals one through ten, respectively. As further illustrated in FIG. 1, the same pattern applies to the multiplication factor cards 3 of a fourth denomination 7, a fifth denomination 8, a sixth denomination 9, a seventh denomination 10, an eighth denomination 11, a ninth denomination 12 and a tenth denomination 13, respectively. The multiplication factor cards 3 of each ten-card denomination are grouped into one of five color categories, with two of the denominations grouped in each category. Accordingly, in a preferred embodiment the multiplication factor cards 3 of the first denomination 2 and the sixth denomination 9 are each typically colored red; the multiplication factor cards 3 of the second denomination 5 and the seventh denomination 10 are each typically colored blue; the multiplication factor cards 3 of the third denomination 6 and the eighth denomination 11 are each typically colored green; the multiplication factor cards 3 of the fourth denomination 7 and the ninth denomination 12 are each typically colored yellow; and the multiplication factor cards 3 of the fifth denomination 8 and the tenth denomination 13 are each typically colored orange. The twenty-four strategy cards 14 typically include eight FREE cards 15 each having the word "FREE" printed or otherwise provided on one face thereof, and sixteen SUBTRACT cards 17, each having the word "SUBTRACT" printed or otherwise provided on one face thereof, the purposes of which FREE cards 15 and SUBTRACT cards 17 will be hereinafter described. Each of the FREE cards 15 is multi-colored and includes a typically red band 15a, a typically blue band 15b, a typically green band 15c, a typically yellow band 15d and a typically orange band 15e, which match the respective color categories of the multiplication factor cards 3 heretofore described.

Referring next to FIGS. 2–7 of the drawings, according to a typical method of play of the multiplication, addition and subtraction card game of this invention, a dealer or first player 19 is initially determined from among multiple players typically by shuffling and placing the card deck 1 in a face-down position, after which each player draws a multiplication factor card 3 from the top of the card deck 1. The player who draws the multiplication factor card 3 which displays the equation having the highest product is the dealer and first player 19. If desired, before play begins the players may determine a total score that must be reached in the game before a winner is declared, in which case the first player who attains the predetermined total score wins the game. The total score may be established by shuffling the card deck 1 and placing the card deck 1 face-down, after which each player draws a multiplication factor card 3 from the top of the card deck 1. The total score equals the product which represents the highest product of all the equations displayed on the drawn cards. Alternatively, the players may simply agree on the magnitude of the total score or determine the total score using another method, as desired.

After the dealer or first player 19 has been determined and the total score to be attained has been established, the dealer or first player 19 shuffles the 124-card deck 1 (FIG. 1), which includes both the multiplication factor cards 3 and the strategy cards 14, and deals a selected number of multiplication factor cards 3, along with the randomly-interspersed FREE cards 15 and SUBTRACT cards 17, to each of the players. The remainder 1a of the card deck 1 is placed face-down in full view of all the players, and the top multiplication factor card 3, FREE card 15 or SUBTRACT card 17 in the card deck 1 is turned face-up to begin a discard pie 28. When his or her turn arrives, each player plays a selected one of his or her dealt multiplication factor cards 3, SUBTRACT cards 17 or FREE cards 15 in a discretionary manner hereinafter described, and places it in the face-up position on the discard pile 28. For maximum point advantage, of his or her dealt cards 26 the player attempts to find a multiplication factor card 3 of any color and the displayed equation of which has a product which equals the product of the equation displayed on the multiplication factor card 3 placed on the discard pile 28 by the previous player. If the player has such a multiplication factor card 3, then the player plays that multiplication factor card 3, and the sum of the products of the equations displayed on the played multiplication factor card 3 and the multiplication factor card 3 on the discard pile 28, respectively, is added to the player's score. The played multiplication factor card 3 is then placed in the face-up position on the discard pile 28. If none of the player's dealt multiplication factor cards 3 displays an equation having the same product as that of the equation displayed on the multiplication factor card 3 placed on the discard pile 28 by the previous player, then the acting player has the option of playing a multiplication factor card 3 having the same color as that of the multiplication factor card 3 on the discard pile 28, in which case the product of the equation displayed on the multiplication factor card 3 lying on the discard pile 28 is added to the player's score. Alternatively, if the player plays a SUBTRACT card 17, then the previous player must subtract from his or her score the product of the equation displayed on the multiplication factor card 3 which that previous player placed on the discard pile 28. The SUBTRACT card 17 is placed in the face-up position on the discard pile 28, and the next player simply plays from his or her set of dealt cards 26 the multiplication factor card 3 which displays the equation having the highest product and adds the product to his or her score. Further in the alternative, if a player was dealt one or more FREE cards 15, then the player may play a FREE card 15, in which case play passes to the next player and the acting player scores the number of points predetermined for a FREE card 15 before play. The player who plays the FREE card 15 selects which color card the next player must play, according to the red band 15a, blueband 15b, green band 15c, yellow band 15d and orange band 15e on the FREE card 15, and the next player plays from his or her set of dealt cards 26 the multiplication factor card 3 of the selected color displaying the equation having the highest product. The FREE card 15 is placed on the discard pile 28, and from his or her set of dealt cards 26 the next player plays the multiplication factor card 3 of the color selected by the previous player and which displays the equation having the highest product of the multiplication factor cards 3 of that color. In the event that a player lacks a SUBTRACT card 17, a FREE card 15, a multiplication factor card 3 the color of which matches the color of the multiplication factor card 3 on the discard pile 28, or a multiplication factor card 3 the displayed equation of which has a product which is the same as the product of the equation displayed on the multiplication factor card 3 lying face-up on the discard pile 28, then the player plays a multiplication factor card 3, SUBTRACT card 17 or FREE card 15 which is picked at random from the remainder 1a of the card deck 1 beneath the discard pile 28. If a multiplication factor card 3 is obtained from the card deck remainder 1a and neither the color of the multiplication factor card 3 nor the product of the equation displayed on the multiplication factor card 3 matches those respective characteristics of the multiplication factor card 3 played and placed on the discard pile 28 by the previous player, then play passes to the next player. The first player who obtains the predetermined number of points or who has the most points after a selected number of rounds of play wins the game. In the event that the first card on the discard pile 28, turned to the face-up position by the first player 19 to begin play, is a FREE card 15 rather than a multiplication factor card 3, the first player 19 chooses which color multiplication factor card 3 the second player 20 must play from his or her dealt cards 26, according to the red band 15a, blue band 15b, green band 15c, yellow band 15d and orange band 15e on the FREE card 15, and the first player 19 scores the predetermined number of points for each FREE card 15. In the event that the first card turned to the face-up position on the discard pile 28 to begin play is a SUBTRACT card 17, the first player 19 scores zero points and play passes to the second player 20, who, from among his or her dealt cards 26, plays the multiplication factor card 3 of any color which displays the equation having the highest product.

Figure 3:
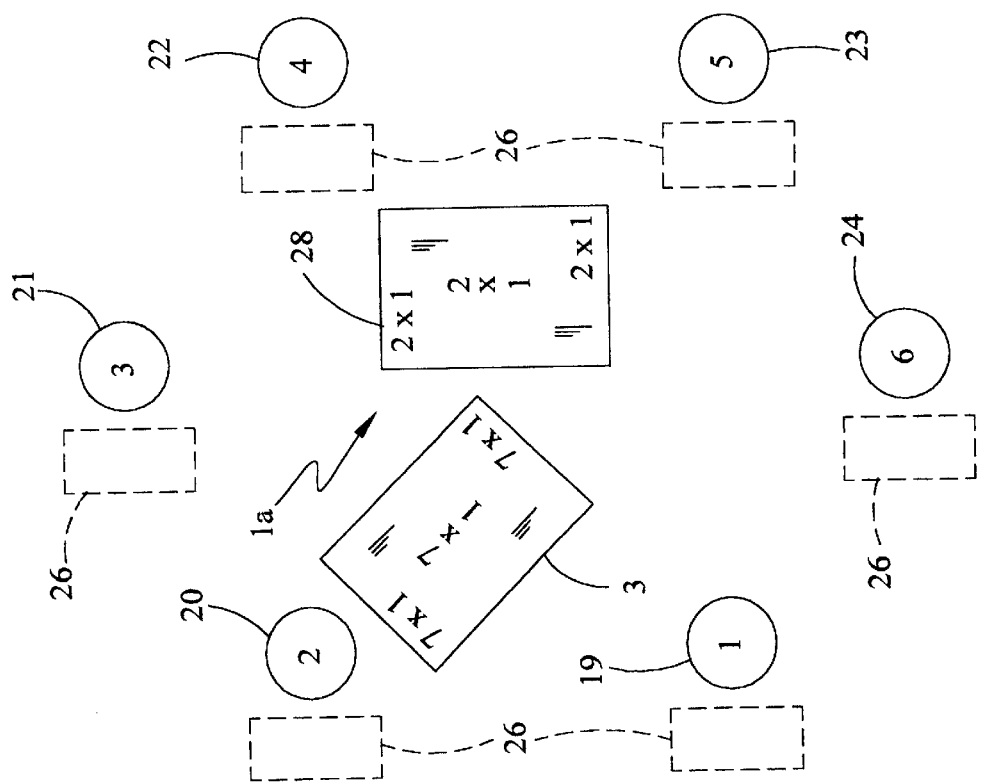
FIG. 3 shows a card play by a second player in the illustrative card game schematic of FIG. 2.
Figure 2:
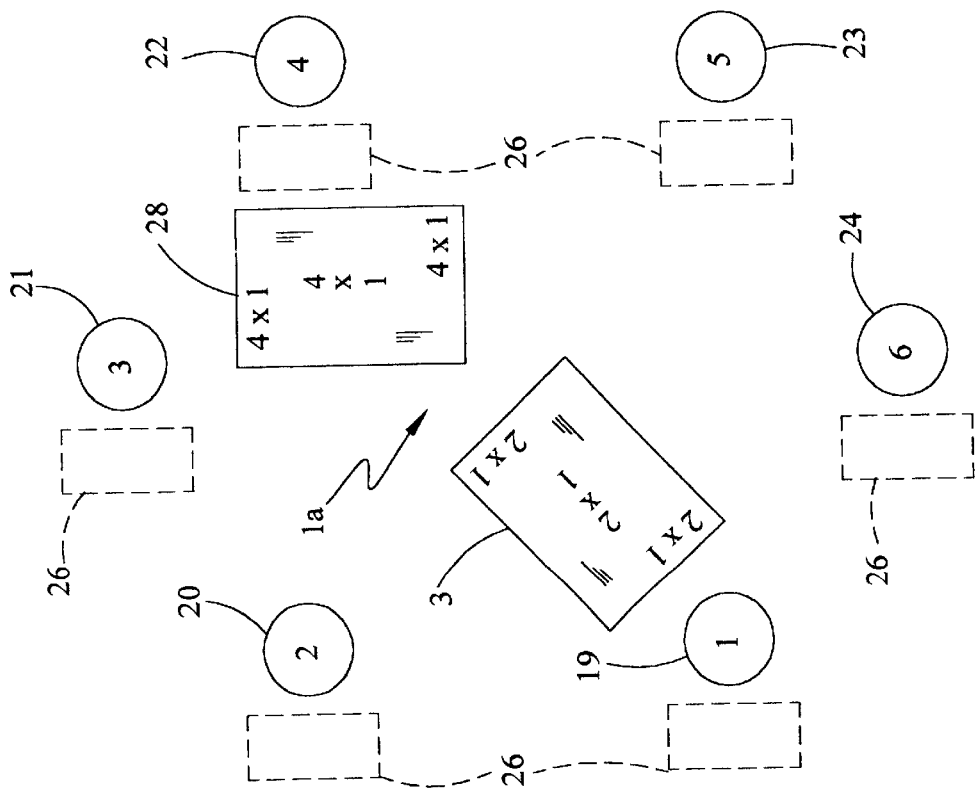
FIG. 2 is a schematic view of a six-player layout for a typical card game, illustrating a first card play by a first player in an illustrative card game of this invention.
Figure 5:
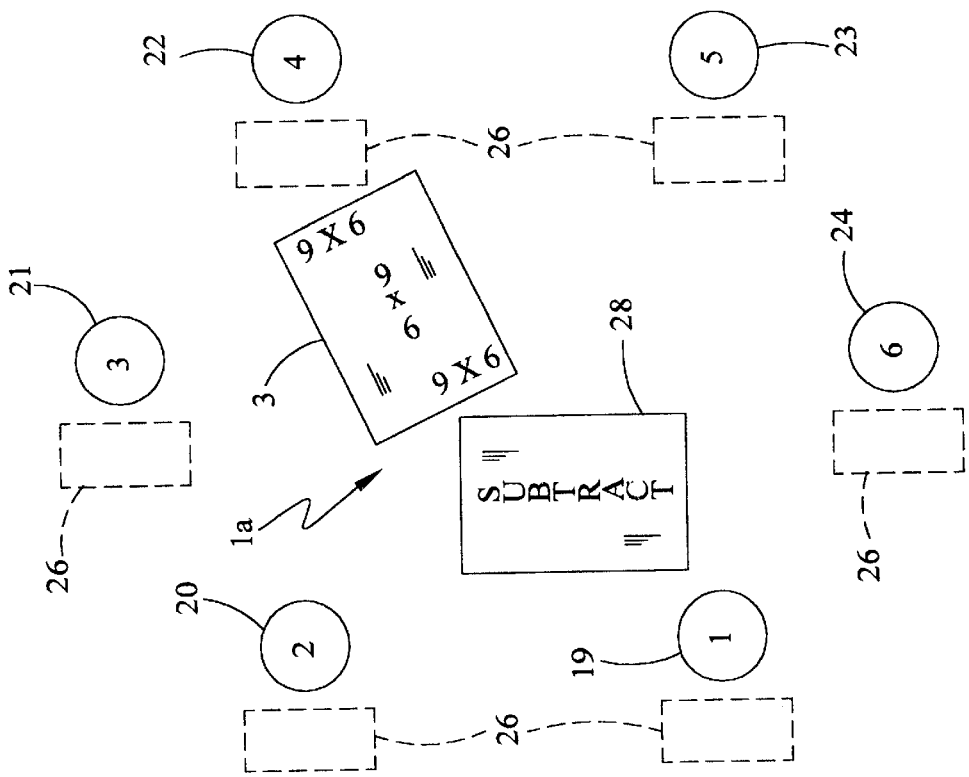
FIG. 5 illustrates a card play by a fourth player in the game.
Figure 4:
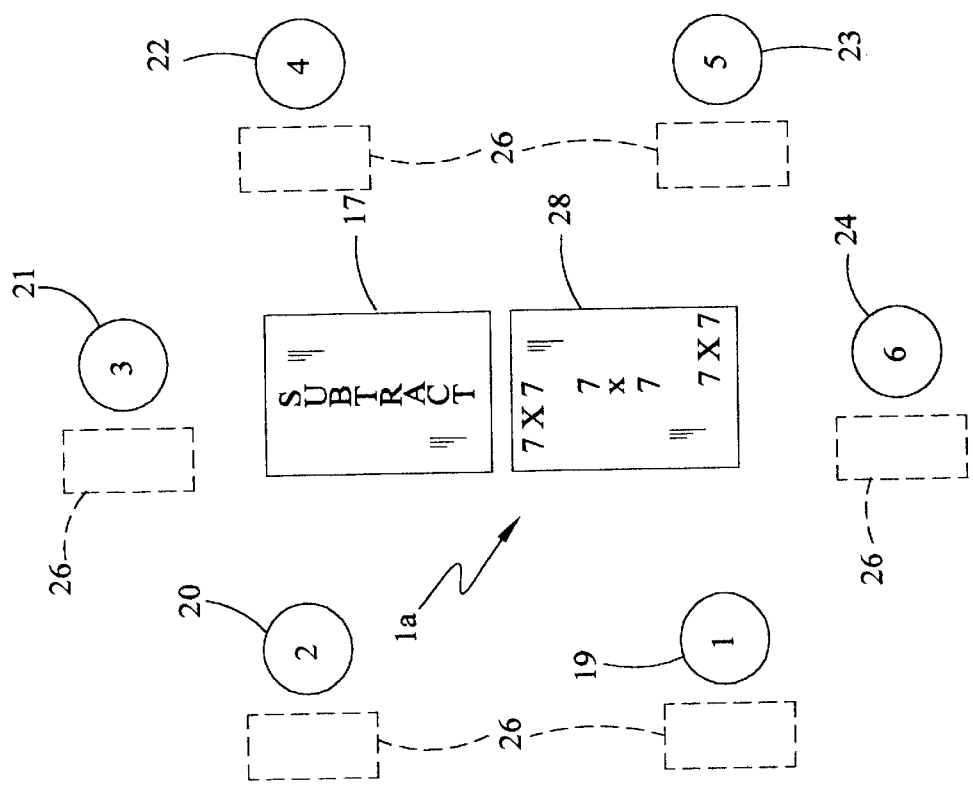
FIG. 4 illustrates a card play by a third player in the game.
Figure 7:
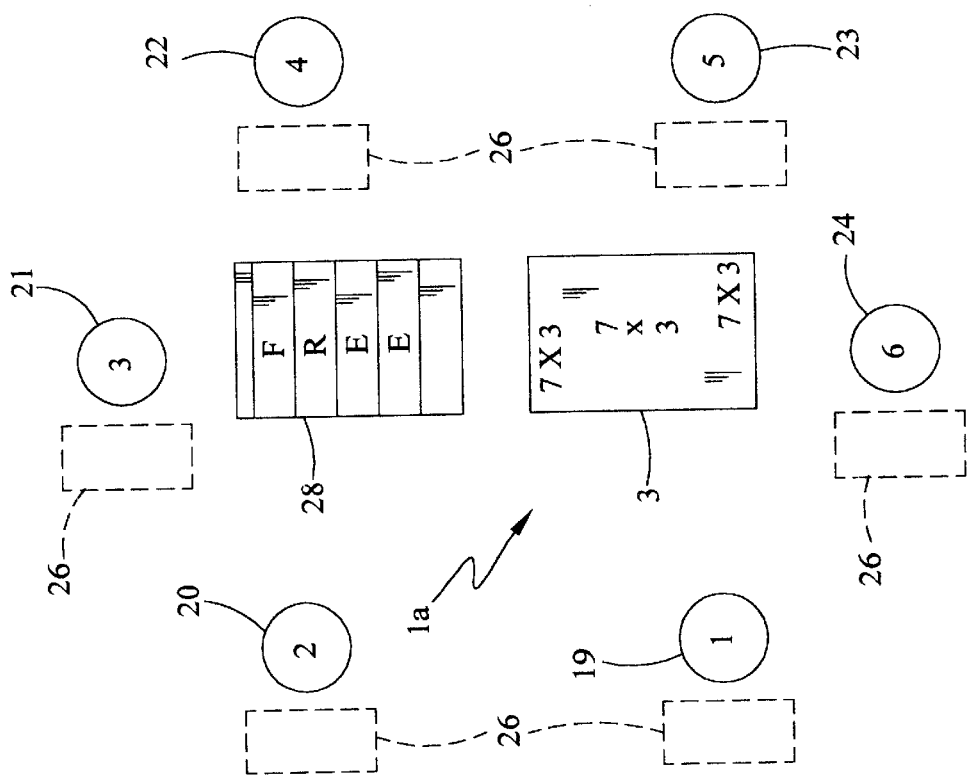
FIG. 7 illustrates a card play by a sixth player in the game.
Figure 6:
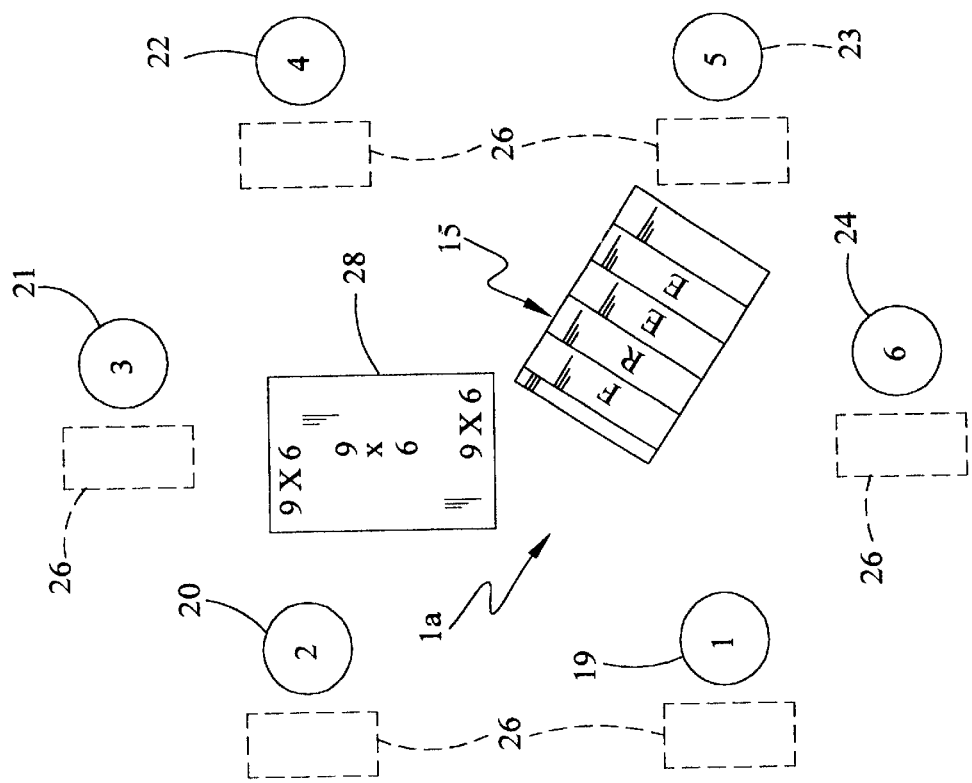
FIG. 6 illustrates a card play by a fifth player in the game.

Referring again to FIGS. 2–7 of the drawings, an illustrative method of play of the multiplication, addition and subtraction card game of this invention is shown schematically. FIGS. 2–7 illustrate a typical layout for the game, which layout includes a first player 19, a second player 20, a third player 21, a fourth player 22, a fifth player 23 and a sixth player 24. While the six-player layout of FIGS. 2–7 has been chosen for purposes of illustration, it will be appreciated by those skilled in the art that any number of players can participate in the multiplication, addition and subtraction card game. The first player 19 initially deals from the card deck 1 a set of dealt cards 26 to each of the players, and places the remainder 1a of the card deck 1 within full view and reach of the players, The top multiplication factor card 3, FREE card 15 or SUBTRACT card 17 in the remaining card deck 1a is placed in the face-up position on the deck 1 to begin the discard pile 28. In the illustrative method of play shown in FIGS. 2–7, the top multiplication factor card 3 on the discard pile 28 displays the equation "4×1", the product of which is "4". From his or her set of dealt cards 26, the first player 19 attempts to select a multiplication factor card 3 of any color and which displays an equation the product of which equals the product of the equation displayed on the face-up multiplication factor card 3 on the discard pile 28. Accordingly, the first player 19 selects and plays a multiplication factor card 3 having the equation "2×2" displayed thereon, the product of which is "4" and equals the product "4" of the equation displayed on the multiplication factor card 3 on the discard pile 28. The initial score of the first player 19 is calculated by adding the product of the equation displayed on the played multiplication factor card 3 with the product of the equation displayed on the face-up multiplication factor card 3 on the discard pile 28, which score in this case is 8, since 4+4=8. After the first player 19 places his or her played multiplication factor card 3 in the face-up position on the discard pile 28, play resumes to the second player 20, as illustrated in FIG. 3. From among his or her dealt cards 26, the second player 20 attempts to select a card 3 which displays an equation the product of which equals the product of the equation displayed on the card 3 placed in the face-up position on the discard pile 28 (which product in this case equals 4, since the face-up multiplication factor card 3 placed on the discard pile 28 by the first player 19 displays the equation "2×2" in FIG. 3). Because the second player 20 does not have a multiplication factor card 3 which displays an equation the product of which is "4", the second player 20 selects and plays a multiplication factor card 3 having the equation "7×7" displayed thereon, the color of which multiplication factor card 3 is blue, the same color as the multiplication factor card 3 lying face-up on the discard pile 28. Accordingly, the initial score of the second player 20 is "4", the product of the equation "2×2" displayed on the multiplication factor card 3 lying face-up on the discard pile 28. Play next resumes to the third player 21 who, as illustrated in FIG. 4, plays a SUBTRACT card 17 from among his or her set of dealt cards 26. Accordingly, since the multiplication factor card 3 on the discard pile 28 displays an equation (7×7) the product of which is "49", the previous, second player 20 must subtract 49 points from his or her score, resulting in a negative score for the second player 20 (4−49=−45), and the third player 21 places the SUBTRACT card 17 on the discard pile 28. As illustrated in FIG. 5, play next resumes to the fourth player 22, who selects and plays the multiplication factor card 3 of all colors having the highest product from among his or her dealt cards 26, which multiplication factor card 3 in this case is the multiplication factor card 3 which displays the equation "9×6". Accordingly, the initial score of the fourth player 22 is "54", the product of the equation "9×6". The fourth player 22 places the "9×6" equation multiplication factor card 3 on the discard pile 28, after which the fifth player 23 selects a FREE card 15 from among his or her dealt cards 26, as illustrated in FIG. 6, and places the FREE card 15 on the discard pile 28. The initial score of the fifth player 23 equals a predetermined number of points set for the FREE card 15 before the game began, for example, 15 points, and the fifth player 23 places the FREE card 15 on the discard pile 28. From among the red band 15*a,* blue band 15*b,* green band 15*c,* yellow band 15*d* and to orange band 15*e* on the FREE card 15, the fifth player 23 chooses which color multiplication factor card 3 the sixth player 24 must play. In this case, the fifth player 23 chooses the color "blue", and the sixth player 24 must therefore play a blue multiplication factor card 3 from among his or her dealt cards 26. From all of the blue multiplication factor cards 3 in his or her set of dealt cards 26, the sixth player 24 selects the blue multiplication factor card 3 having the highest product which, in this case, is the multiplication factor card 3 having the equation "7×3" displayed thereon, as illustrated in FIG. 7. The sixth player 24 completes the first round of the game by playing the blue multiplication factor card 3 having the equation "7×3" displayed thereon and placing the multiplication factor card 3 in face-up position on the discard pile 28, and the initial score of the sixth player 24 is 21, the product of 7×3. Play next resumes to the first player 19, and play continues in the foregoing manner until one of the players has reached the predetermined number of points established before the game began or until the players have completed a predetermined number of play rounds.

Referring again to FIG. 1 of the drawings, it will be appreciated by those skilled in the art that the multiplication addition and subtraction card game of this invention provides an effective and entertaining method of strengthening multiplication, addition and subtraction skills. It is understood that numerous variations of the card game can be played using the card deck 1, as desired according to the creativity of the players. It is further understood that the various color-coded categories of the multiplication factor cards 3 can be any desired colors, not limited to red, blue, green, yellow and orange, described above. It will be further appreciated by those skilled in the art that the card deck 1 can include the multiplication factor cards 3 with or without any desired number of the strategy cards 14 for playing the multiplication, addition and subtraction card game.

While the preferred embodiments of the invention have been described above, it will be recognized and understood that various modifications can be made in the invention and the appended claims are intended to cover all such modifications which may fall within the spirit and scope of the invention.

Having described my invention with the particularly set forth above, what is claimed is:

1. A method of playing a mathematical card game by completing a plurality of successive card plays, said method comprising:

providing a deck of cards having a plurality of playing cards including a plurality of multiplication factor cards and a multiplication equation displayed on each of said multiplication factor cards;

drawing a selected number of said playing cards from said deck of cards to define a selected number of dealt sets of cards; and completing at least one of said card plays by designating one of said playing cards as a discard pile card; calculating the product of said multiplication equation displayed on each of said multiplication factor cards in one of said dealt sets of cards; selecting one of said multiplication factor cards from said one of said dealt sets of cards, wherein the product of said multiplication equation displayed on said one of said multiplication factor cards equals the product of said multiplication equation displayed on said discard pile card; calculating the sum of the product of said multiplication equation displayed on said one of said multiplication factor cards and the product of said multiplication equation displayed on said discard pile card; and defining a score by converting the numerical value of said sum into a corresponding number of points.

2. A method of playing a mathematical card game by completing a plurality of successive card plays, said method comprising;

providing a deck of cards having a plurality of playing cards including a plurality of multiplication factor cards and a multiplication equation displayed on each of said multiplication factor cards;

drawing a selected number of said playing cards from said deck of cards to define a selected number of dealt sets of cards; and completing a least one of said card plays by designation one of said playing cards as a discard pile card; calculating the product of said multiplication equation displayed on each of said multiplication factor cards in one of said dealt sets of cards; selecting one of said multiplication factor cards from said one of said dealt sets of cards, wherein the product of said multiplication displayed on said one of said multiplication factor cards equals the product of said multiplication equation displayed on said discard pile card; calculating the sum of the product of said multiplication equation displayed on said one of said multiplication factor cards and the product of said multiplication equation displayed on said discard pile card; and defining a score by converting the numerical value of said sum into a corresponding number of points, wherein each said plurality of multiplication factor cards is one of a plurality of colors and said plurality of playing cards further comprises a selected number of FREE cards each displaying said plurality of colors, respectively; and further comprising completing at least a second one of said card plays by designating one of said FREE cards as said discard pile card; designating a selected color on said one of said FREE cards; playing from one of said dealt sets of cards a selected one of said multiplication factor cards having said selected color; calculating the product of said multiplication equation displayed on said one of said multiplication factor cards having said selected color; and defining a second score by converting into points the numerical value of the product of said multiplication equation displayed on said one of said multiplication factor cards having said selected color.

3. The method of claim 1 wherein said plurality of playing cards further comprises a selected number of SUBTRACT cards and comprising completing at least a second one of said card plays by playing said SUBTRACT card from one of said dealt sets of cards and subtracting the product of said equation displayed on said discard pile card from said score.

4. The method of claim 3 wherein each of said plurality of multiplication factor cards is one of a plurality of colors and said plurality of playing cards further comprises a selected number of FREE cards each displaying said plurality of colors, respectively; and further comprising completing at least a third one of said card plays by designating one of said FREE cards as said discard pile card; designating a selected color on said one of said FREE cards; playing from one of said dealt sets of cards one of said multiplication factor cards having said selected color; calculating the product of said multiplication equation displayed on said one of said multiplication factor cards having said selected color; and defining a second score by converting into points the numerical value of said product of said multiplication equation displayed on said one of said multiplication factor cards having said selected color.

5. A method of playing a mathematical card game by completing a plurality of successive card plays, said method comprising:

providing a deck of cards having a plurality of playing cards including a plurality of multiplication factor cards each having one of a plurality of colors and a multiplication equation displayed on each of said multiplication factor cards;

drawing a selected number of said playing cards from said deck of cards to define a selected number of dealt sets of cards; and completing at least one of said card plays by designating one of said playing cards as a discard pile card; calculating the product of said multiplication equation displayed on each of said multiplication factor cards in one of said dealt sets of cards; selecting one of said multiplication factor cards from said one of said dealt sets of cards, wherein the product of said multiplication equation displayed on said one of said multiplication factor cards does not equal the product of said multiplication equation displayed on said discard pile card and said one of said multiplication factor cards is the same color as said discard pile card; and defining a score corresponding in numerical value to the product of said multiplication equation displayed on said discard pile card.

6. The method of clam 5 further comprising completing at least a second one of said card plays by designating a second discard pile card; selecting a second one of said multiplication factor cards from one of said dealt sets of cards, wherein the product of said multiplication equation displayed on said second one of said multiplication factor cards equals the product of said multiplication equation displayed on said second discard pile card; calculating the sum of the product of said multiplication equation displayed on said second one of said multiplication factor cards and the product of said multiplication equation displayed on said second discard pile card; and defining a second score by converting the numerical value of said sum into a corresponding number of points.

7. The method of claim 5 wherein each of said multiplication factor cards is one of a plurality of colors and said plurality of playing cards further comprises a selected number of FREE cards each displaying said plurality of colors, respectively; and further comprising completing at least a second one of said card plays by designating one of said FREE cards as said discard pile card; designating a selected color on said one of said FREE cards; playing from one of said dealt sets of cards one of said multiplication factor cards having said selected color; calculating the product of said multiplication equation displayed on said one of said multiplication factor cards having said selected color; and defining a second score by converting the numerical value of the product of said multiplication equation displayed on said one of said multiplication factor cards into points.

8. The method of claim 7 further comprising completing at least a third one of said card plays by designating a third discard pile card; selecting a second one of said multiplication factor cards from one of said dealt sets of cards, wherein the product of said multiplication equation displayed on said second one of said multiplication factor cards equals the product of said multiplication equation displayed on said third discard pile card; calculating the sum of the product of said multiplication equation displayed on said second one of said multiplication factor cards and the product of said multiplication equation displayed on said third discard pile card; and defining a second score by converting the numerical value of said sum into a corresponding number of points.

* * * * *